Sept. 20, 1949.  C. R. STEVENS  2,482,299
MELTING AND DRAWING CRUCIBLE

Filed May 1, 1946  3 Sheets-Sheet 1

INVENTOR
CHARLES R. STEVENS
BY
Toulmin & Toulmin
ATTORNEYS

Sept. 20, 1949. C. R. STEVENS 2,482,299
MELTING AND DRAWING CRUCIBLE

Filed May 1, 1946 3 Sheets-Sheet 2

INVENTOR
CHARLES R. STEVENS
BY
Toulmin & Toulmin
ATTORNEYS

Sept. 20, 1949.  C. R. STEVENS  2,482,299
MELTING AND DRAWING CRUCIBLE
Filed May 1, 1946  3 Sheets-Sheet 3

INVENTOR
CHARLES R. STEVENS
BY
Toulmin & Toulmin
ATTORNEYS

Patented Sept. 20, 1949

2,482,299

UNITED STATES PATENT OFFICE 2,482,299

MELTING AND DRAWING CRUCIBLE

Charles R. Stevens, Toledo, Ohio, assignor, by mesne assignments, to Glass Fibers, Inc., Waterville, Ohio Application May 1, 1946, Serial No. 666,254

13 Claims. (Cl. 49—53)

This invention relates to a heating crucible for melting raw materials that are to be drawn into fine fibers or filaments and particularly for melting of glass materials and refining thereof so that glass fibers or filaments can be drawn free of imperfections and be of uniform character.

An object of the invention is to provide a heating or melting crucible from which fibers or filaments can be drawn from the material melted therein, wherein the crucible is provided with a chamber in which the materials are melted and separated from a chamber from which the melted materials are drawn, and wherein the second chamber may be placed under pressure greater than atmosphere while the first chamber remains open to atmospheric pressure to allow freedom of introduction of raw materials into the melting chamber.

A further object of the invention is to provide a melting and drawing crucible in accordance with the foregoing object that is especially adapted for the melting and drawing of glass materials wherein the raw glass materials are introduced into the melting chamber and are refined in their passage into the drawing chamber to cause included gas to be driven from the molten glass in passing into the drawing chamber.

Still another object of the invention is to provide a melting and drawing crucible for drawing of fine fibers or filaments wherein the material that is melted within the crucible is utilized for maintaining a seal between the melting chamber and the drawing chamber of the crucible so that the drawing chamber can be maintained under pressure greater than atmosphere.

Still another object of the invention is to provide an improved melting and drawing crucible in accordance with any of the foregoing objects that is heated by the use of high frequency current, and wherein the high frequency coil for heating the crucible is specially constructed as a one-piece unit to obtain maximum inductive heating effect upon the crucible.

Still another object of the invention is to provide a melting and drawing crucible in accordance with any of the foregoing objects wherein the crucible and the high frequency induction coil about the same, and the parts of the crucible, are all arranged concentrically to obtain a maximum heating effect upon the materials within the crucible, provide for minimum loss of high frequency induction currents, and the crucible to induction coil relation is most satisfactory for flux linkage and impedance matching factors.

Another object of the invention is to provide an improved melting and drawing crucible wherein high frequency current for melting the glass is concentrated in the melting chamber and in a planing edge over which the melted material flows.

Another object of the invention is to provide a melting and drawing crucible in accordance with any of the foregoing objects wherein an induction coil is positioned beneath the melting crucible as well as around the sides thereof to concentrate the high frequency energy in the melting crucible, and a high frequency induction coil is also positioned closely adjacent a planing edge provided between the melting and drawing crucible to cause the planing edge to be at a relative high temperature for the purpose of refining melted material, such as glass, in its flow from the melting chamber into the drawing chamber.

Further objects and advantages will become apparent from the drawings and the following description.

Figure 1:
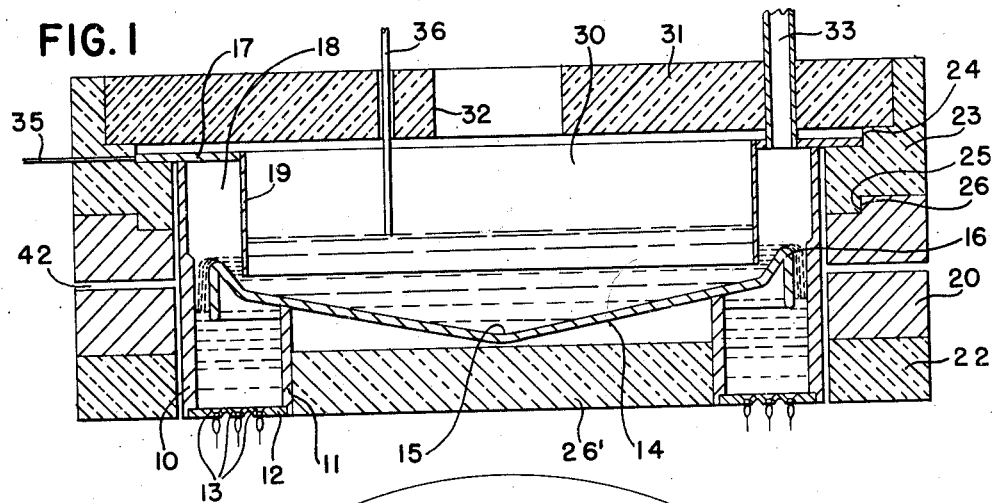
Figure 1 is a vertical cross-sectional view through a melting and drawing crucible constructed in accordance with this invention.
Figure 2:
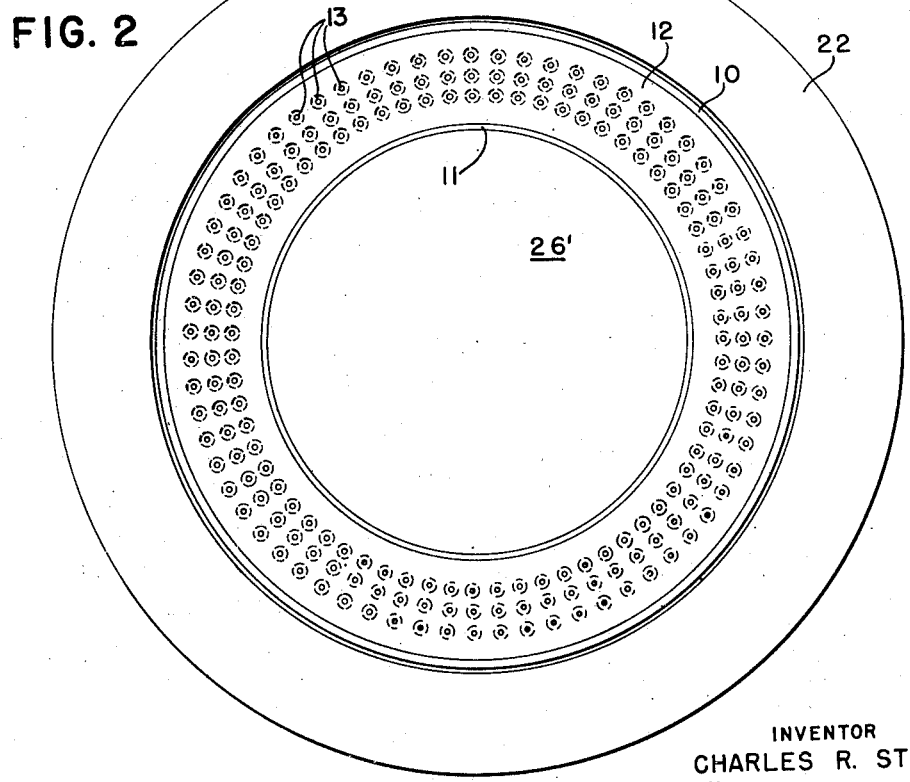
Figure 2 is a bottom view of the device illustrated in Figure 1.

The melting and drawing crucible of this invention is particularly adapted for the drawing of fine fibers or filaments on the order of .00025 to .0003" in diameter. The conditions under which such fine filaments are drawn from molten materials must be precisely controlled to avoid any variation in the diameter of the drawn filament. This is particularly true when drawing glass fiber, to which the apparatus is especially adapted.

It has been determined that glass fibers or filaments may be drawn to exceedingly small diameters by drawing the glass at temperatures substantially below what is normally termed a melting temperature thereof. To draw the fibers or filaments while the glass is held at constant temperature in the neighborhood of 2,250° F., it has been found entirely satisfactory to cause the molten material to be exuded through fine orifices in the nature of .004" by causing the body of the molten material to be retained under a constant pressure to exude the material at a constant rate through the orifices and to draw the glass as exuded at a constant rate to obtain constant diameter filaments.

However, by melting materials, and particularly when melting glass materials, gases are formed or liberated in the process of melting so that difficulty of control of the pressure in the melting chamber has been occasioned due to the variable factor of the quantity of gas that may be evolved or liberated from the materials during the melting process. Also, molten materials, and particularly glass, quite readily absorb gases. Such gas inclusions cause difficulty in the drawing of fine fibers, and therefore it is necessary that the gases in contact with a molten material that is to be drawn into fine fibers be controlled as to the type of gas to avoid the gases going into solution in the molten material.

In a continuous operation of drawing fibers or filaments, it is preferable that the raw materials that are undergoing the melting operation be introduced in the heating crucible in such a manner that no special seals are required for holding the interior of the melting chamber under pressure, and also to allow for escape of the gases that are liberated by the materials during the melting process. The melted materials may then be conducted into a drawing chamber that is held under pressure, if desired, by means of a gas that has a very low absorption rate into the molten material.

In this invention, the melting and drawing crucible is constructed in such a manner that raw materials may be introduced into an open melting chamber, and the melted material is refined in its passage into a closed drawing chamber to thereby insure against passage of particles of raw material into the drawing chamber and exclusion of included gases from the molten material.

The melting and drawing crucible of this invention, as illustrated in Figure 1, is cylindrical in cross-section and consists of an outer cylindrical wall 10 and an inner cylindrical wall 11 between which there is provided a horizontal orifice plate 12 in the form of an annular ring. The orifice plate 12 contains a plurality of orifices 13 through which the molten material positioned upon the orifice plate is exuded.

The inner cylindrical wall 11 of the melting and drawing crucible supports a planing plate 14 that has a central recessed portion 15 and a raised ledge or edge 16 extending annularly around the plate. The edge 16 forms a planing edge over which the molten material flows in refining the molten material.

An annular ring 17 is secured to the upper edge of the outer cylindrical wall 10 of the crucible and forms the top wall of a drawing or pressure chamber 18 which is closed by an inner cylindrical wall 19 secured to the annular plate 17.

A high frequency induction coil 20, hereinafter more specifically described, encircles the outer wall 10 of the heating crucible and is adapted to be connected to a suitable source of high frequency current for inductively heating the wall 10 of the crucible and inductively heating the other metal parts of the crucible that fall within the effect of the field set up by the induction coil 20.

The walls of the crucible heretofore referred to are preferably constructed of platinum or a platinum-rhodium alloy to withstand the high temperature involved in melting the glass and to avoid contamination of the glass.

The planing edge 16 of the planing plate 15 will, because of its position relative to the induction coil 20 and because of its contour, be a hot edge over which the molten material can pass for refining of the material and passing into the drawing chamber 18.

The wall 19 of the crucible, together with the recessed portion 15 of the planing plate, forms a melting chamber into which raw materials are introduced for melting thereof through the open top of the crucible.

The melting and drawing crucible is enclosed within a heat insulating wall provided by the annular wall members 22 and 23. The annular wall member 23 is provided with an annular shoulder 24 which receives the outer edge of the cover-plate 17 to concentrically locate the wall 23 relative to the wall 10 of the heating crucible. This wall member 23 is also provided with an annular shoulder 25 that is engaged by a corresponding annular shoulder 26 provided in the high frequency induction coil 20 for the purpose of concentrically locating the high frequency coil relative to the wall 23 and therefore relative to the outer wall 10 of the heating crucible.

A disc 26' of heat insulating material is positioned within the inner wall 11 of the heating crucible and disposed beneath the planing plate 14. The melting chamber 30 provided within the circular member 19 is provided with a closure wall 31 supported by the wall 23. The wall 31 has an opening 32 through which raw materials in any form may be introduced into the melting chamber 30.

To provide for the introduction of gas under pressure into the drawing chamber 18 for the purpose of maintaining the pressure in this chamber above atmosphere, a conduit 33 is secured to the wall 17 of the crucible and is adapted to be connected to a source of gas under pressure that is suitable for introduction into the drawing chamber 18, and which will not be dissolved to a high degree in the molten material within the drawing chamber.

The quantity of molten material within the melting chamber 30 may be controlled by means of an electrically operated feeding mechanism that is started and stopped in response to the level of the molten material in the chamber 30. The melting and drawing crucible may be connected to the electrical mechanism for operating the feeding device by means of an electric wire 35 to form one side of an electric circuit. The other side of an electric circuit may be provided by an electrode member 36 that may extend down through the cover 31. Since molten glass is a conductor of electricity when in the molten condition, it will be apparent that when the level of the molten material rises in the melting chamber 30 to a point at which the end of the electrode 36 is engaged thereby, an electric circuit may be closed between the conductor and the wire 35 for actuating an electrical device which may open a circuit to an electrically operated feeding mechanism to thereby stop the feeding mechanism in response to the high level of molten material in the chamber 30. Conversely, when the level of molten material within the chamber 30 falls below the end of the electrode 36, electric circuit will be broken between the electrode 36 and the wire 35 so that the electrical device controlled by this circuit may close a circuit through the feeding mechanism and thereby cause raw materials to be admitted into the chamber 30 through the opening 32.

The molten material in the melting chamber 30 will rise to the level of the edge 16 of the planing plate 14, and will thereafter overflow the edge of the planing plate into the drawing chamber 18. If atmospheric pressure is retained in the chambers 18 and 30, and level of the molten material on both sides of the wall 19 will be the same. However, if a pressure above atmosphere is retained within the chamber 18, the level of the molten material will be reduced within the chamber 18 and will rise within the chamber 30 until a balance is struck between the head of material in the chamber 30 and the pressure in the chamber 18. Such a condition is illustrated in Figure 1. It will be noted that the area of the molten body in the melting chamber is considerably larger than the area of the molten metal between the planing edge 14 and the wall 19 so that a substantial pressure can be applied in the chamber 18 without requiring an extremely large rise in the level of the material in the chamber 30. The principle involved is that of a U-tube wherein one leg is of greater cross-sectional area than that of the opposing leg.

The wall 19 will prevent particles of raw material from entering into the drawing chamber 18 because the molten material must pass beneath the lower edge of the wall 19 before it can pass over the edge 16 of the planing plate. Also, the molten material between the wall 19 and the edge 16 of the planing plate produces a seal at this point between the drawing chamber 18 and the melting chamber 30 to prevent a loss of pressure from the chamber 18 without in any way affecting delivery of melted material into the chamber.

Figure 3:
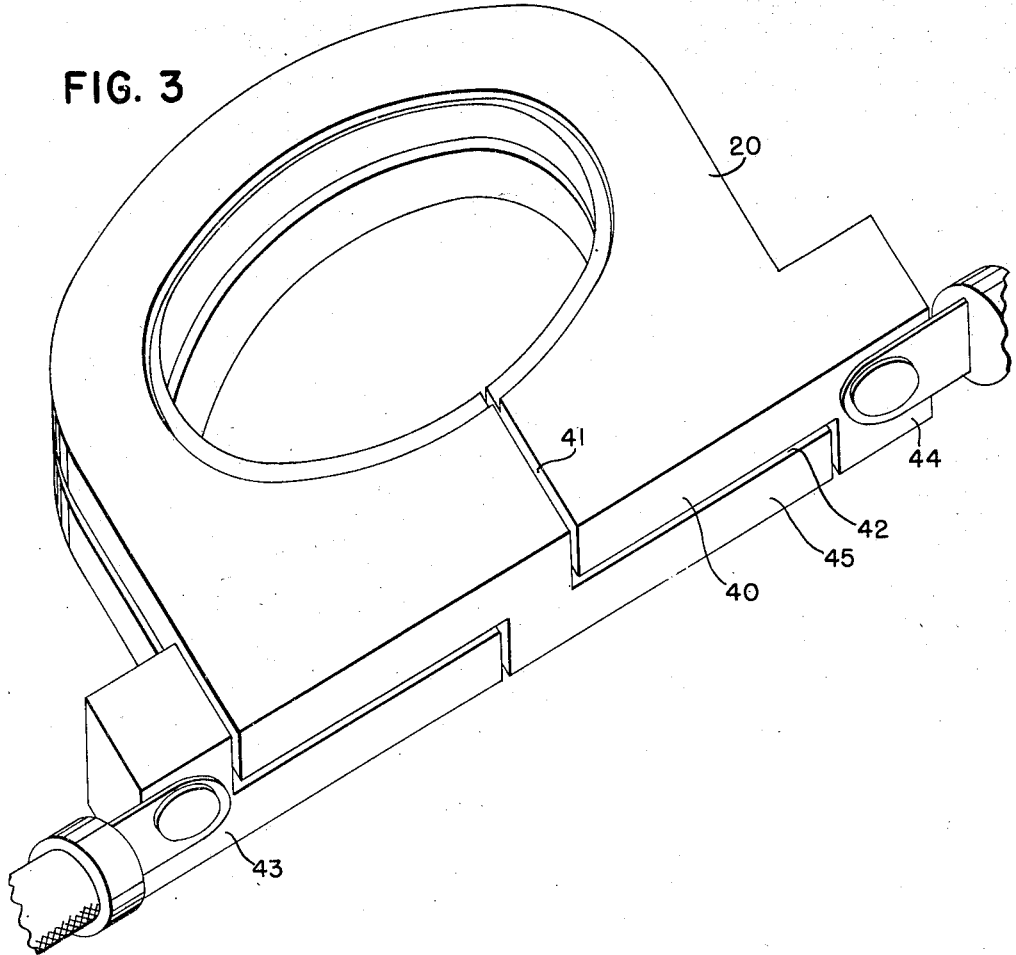
Figure 3 is a perspective elevational view of th high frequency induction coil used with the apparatus shown in Figure 1.

The high frequency induction coil 20 heretofore referred to is more particularly illustrated in Figure 3. The high frequency coil is constructed in one piece and is a solid member. The high frequency coil 20, while constructed in one piece, is manufactured in such a manner that the coil is arranged in two different levels. The upper ring 40 of the electrode 20 encircles the heating crucible heretofore referred to and terminates at the gap 41 provided between the starting point of the electrode 20 and the point at which the upper level portion 40 of the electrode drops to the lower level portion 45. The lower level portion 45 of the electrode is separated from the upper level portion 40 by means of a gap 42 that extends between the upper and lower level portions annularly around the same. The lower level portion 45 terminates in a terminal block 43, a similar terminal block 44 being provided for the upper level portion 40.

The electrode constructed in the manner shown in Figure 3 provided a substantially uniform field of high frequency current around the mid-portion of the melting and drawing crucible. The high frequency coil 20 is adapted for connection to any suitable source of high frequency current for inducing the proper frequency within the field established by the high frequency coil for heating the melting and drawing crucible.

Figure 4:
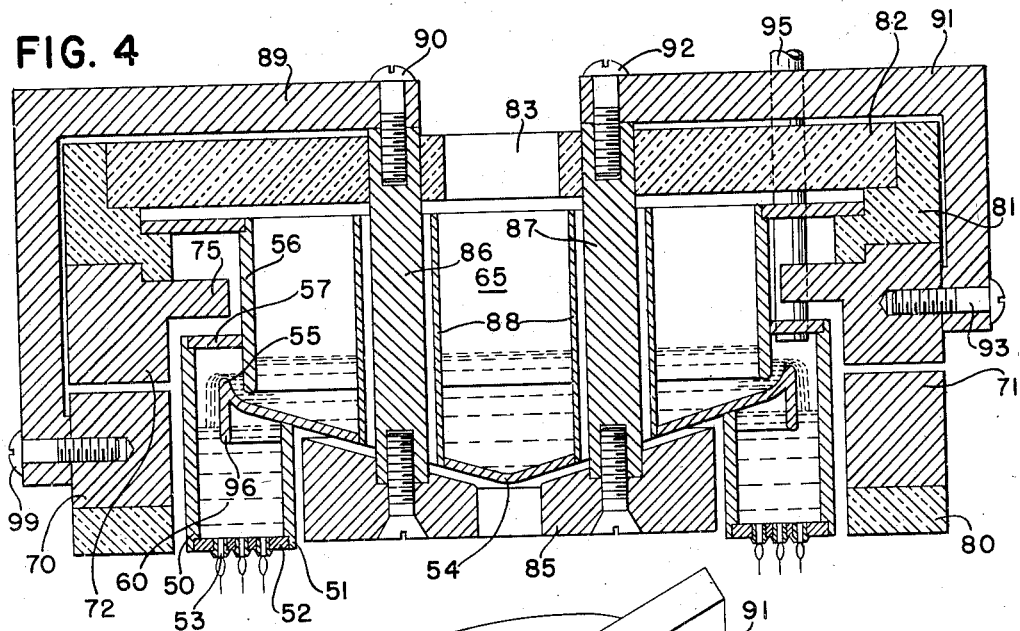
Figure 4 is a vertical cross-sectional view through a melting and drawing crucible illustrating a modified construction of the device from that illustrated in Figure 1.
Figure 5:
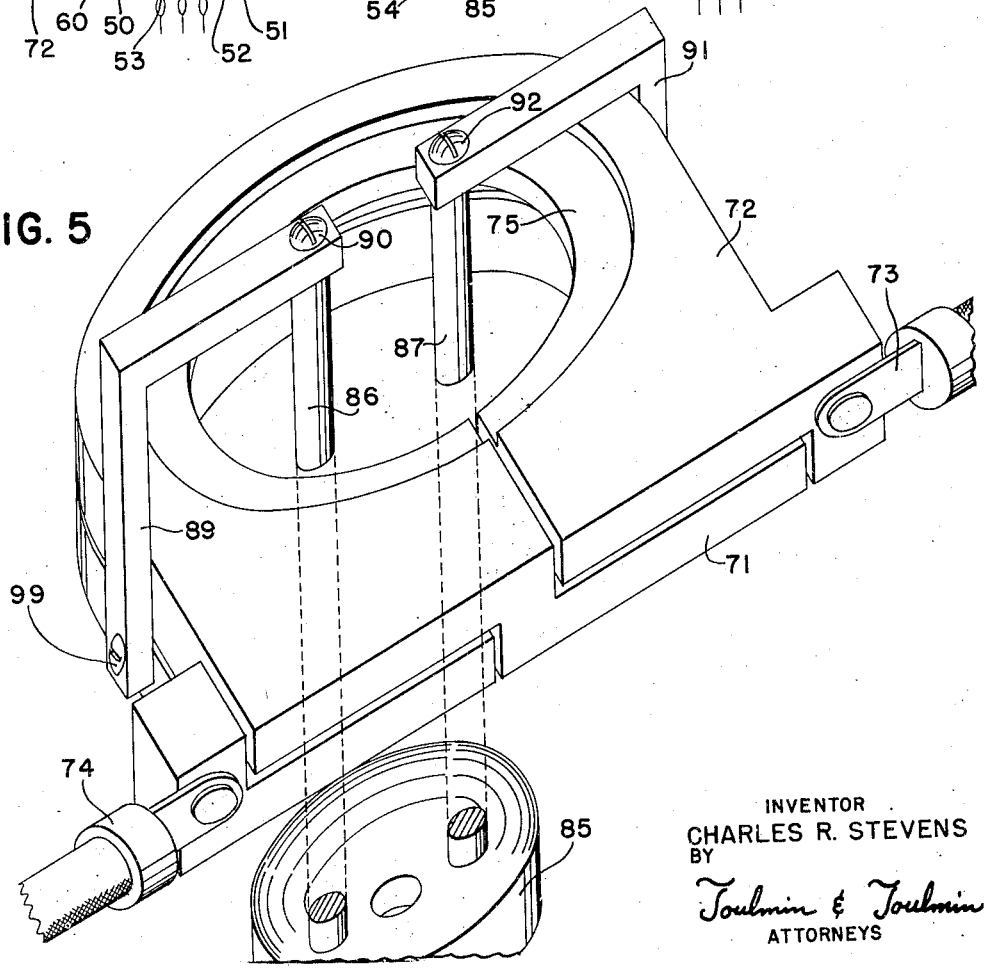
Figure 5 is a perspective elevational view of the construction of the induction coil and assembly thereof for the device illustrated in Figure 4.

In Figures 4 and 5 there is illustrated a modified arrangement of the melting and drawing crucible heretofore disclosed and described. The melting and drawing crucible, illustrated in Figure 4, consists of an outer cylinderical wall 50 and an inner cylinderical wall 51 that receive between them an annular ring orifice plate 52 having a plurality orifice 53 therein through which molten material is exuded.

The inner cylindrical wall 51 supports a planing plate 54 that has a raised ledge 55 extending annularly around the plate 54 and forms a planing edge over which molten material flows, and is refined.

An annular ring 56 is positioned with the lower edge thereof closely adjacent the planing edge 55. An annular ring plate 57 extends between the ring 56 and the wall 50 to close the upper portion of the drawing chamber 60. The space bounded by the ring 56 and the planing plate 54 provides a melting chamber 65.

An induction coil 70 is positioned around the melting and drawing crucible and, in general, is constructed in the same manner as the induction coil previously disclosed and described in regard to Figure 3, and consists of a lower induction ring 71 and an upper induction ring 72 having the conductors 73 and 74 connected thereto respectively.

The upper induction ring 72 is provided with an annularly inwardly extending flange 75 that is disposed closely adjacent the upper wall 57 of the drawing chamber 60 and ring 56 of the melting chamber 65. It will be noted that the wall 57 of the drawing chamber 60 is closely adjacent the planing edge 55 of the planing plate 54 so that the flanged portion 75 of the upper induction ring 72 is disposed closely adjacent the planing edge 55 to thereby concentrate high frequency induction energy in the area in which the planing edge 55 is positioned for maintaining this edge at the highest possible temperature to obtain the best refining of molten glass as it passes over the planing edge.

While the arrangement of the induction coil as illustrated in Figure 1 induces a high temperature in the planing edge of the planing plate 15 thereof, yet the arrangement of the device illustrated in Figure 4 increases the effectiveness of the high frequency energy in maintaining a high temperature planing edge.

The melting and drawing crucible is enclosed by insulating walls 80, 81 and 82 of refractory material. The upper wall 82 has an opening 83 therein through which raw material is introduced in melting chamber 65.

To increase the effectiveness of the high frequency energy in heating the melting chamber 65 and melting material therein, an induction ring 85 is disposed adjacent the outer surface of the planing plate 54, and closely follows the contour of the wall 54 to uniformly heat the same. The induction ring 85 is suspended from a pair of legs 86 and 87 that passes downwardly through tubes 88 which pass through the melting chamber 65.

The leg 86 is secured to a right angle bracket 89 by means of a screw 90 which is attached to the lower induction ring 71 by means of a screw 99. The leg 87 is similarly attached to a right angle bracket 91 by means of a screw 92. The right angle bracket 91 is however attached to the upper induction ring 72 by means of a screw 93. The connections thus made to the induction rings 71 and 72 for the induction ring 75 places the same substantially parallel with the induction coil 70 without effectively cutting out any portion of the induction coil 70.

The drawing chamber 60 is adapted to be maintained under pressure above atmosphere in the same manner heretofore disclosed and described with reference to the device illustrated in Figure 1. For this purpose a conduit 95 communicates with the drawing chamber 60 for admission of gases which are not readily soluble in the molten material. The level of the molten material in the drawing chamber 60 is carried at a height to at least engage the lower edge 96 of the planing plate to prevent any free fall of the molten material from the planing plate into the drawing chamber which would tend to disturb the body of molten material in the drawing chamber, and to avoid any possibility of the molten material picking up gas due to the disturbance which might be created upon the free fall of the molten material. This condition is true for the apparatus illustrated in Figure 4 as well as that illustrated in Figure 1.

The operation of the device illustrated in Figure 4 is the same as that disclosed and described with regard to the device illustrated in Figure 1, but the induction coils of the device illustrated in Figure 4 have been arranged to provide for maximum efficiency of heating the material within the melting chamber, of heating the planing edge of the planing plate to refine the molten material and to maintain uniform temperature in the drawing chamber.

While the apparatus disclosed and described herein constitutes a preferred form of the invention, yet it is understood that the apparatus is capable of alteration without departing from the spirit of the invention, and that all modifications that fall within the scope of the appended claims are intended to be included herein.

Having thus fully described my invention, what I claim as new and desire to secure by Letters Patent is:

1. A melting and drawing crucible comprising, means forming an annular drawing chamber including an outer and an inner annular wall connected by a transverse wall and having a plurality of orifices in said transverse wall through which molten material can be exuded, a circular member extending transversely of said inner wall and passing therethrough into the space between said inner and outer walls, said inner wall and said circular member comprising a melting chamber, and passage means in said inner wall at the juncture between the said wall and said circular member for flow of molten material from the melting chamber into the drawing chamber therethrough and over the edge of said member.

2. A melting and drawing crucible comprising, means forming an annular drawing chamber including an outer and an inner annular wall connected by a transverse wall and having a plurality of orifices in said transverse wall through which molten material can be exuded, a circular member extending transversely of said inner wall and passing therethrough into the space between said inner and outer walls, said inner wall and said circular member comprising a melting chamber, and passage means in said inner wall at the juncture between the said wall and said circular member for flow of molten material from the melting chamber into the drawing chamber, said circular member having an annular edge thereof extending upwardly into said drawing chamber to a position above the level of said passage means to cause molten material to flow upwardly over said edge in passage into said drawing chamber.

3. A melting and drawing crucible comprising, means forming an annular drawing chamber including an outer and an inner annular wall and having a plurality of orifices in one transverse wall thereof through which molten material can be exuded, a circular member extending transversely of said inner wall and passing therethrough into the space between said inner and outer walls, said inner wall and said circular member comprising a melting chamber, passage means through said inner wall for flow communication of the molten material from the melting chamber into the drawing chamber, said circular member having an annular edge thereof extending upwardly into said drawing chamber to a position above the level of said passage means to cause molten material to flow upwardly over said edge in passage into said drawing chamber, and a high frequency induction coil encircling said outer wall substantially opposite said edge of said circular member for inductively heating the said walls and said member.

4. A melting and drawing crucible comprising, inner and outer annular walls connected by transverse walls extending therebetween to thereby form a chamber closed at the top and bottom thereof, the lower one of said transverse walls having a plurality of orifices therein through which molten material may be exuded, a circular wall member extending transversely of said inner wall intermediate of said transverse walls and having a peripheral edge thereof positioned within the space between said inner and outer walls, said inner wall and said member forming a chamber to receive materials to be melted therein, and passage means through said inner wall at the juncture between the said wall and said circular member for material flow from said melting chamber into said drawing chamber over said edge of said member, said edge of said member being positioned at a level above said passage means to provide a pool of molten material between said edge and said inner wall to form a fluid seal between said drawing chamber and said melting chamber.

5. A melting and drawing crucible comprising, inner and outer annular walls connected by transverse walls extending therebetween to thereby form a chamber closed at the top and bottom thereof, the lower one of said transverse walls having a plurality of orifices therein through which molten material may be exuded, a circular wall member extending transversely of said inner wall intermediate of said transverse walls and having a peripheral edge thereof positioned within the space between said inner and outer walls, said inner wall and said member forming a chamber to receive materials to be melted therein, passage means through said inner wall at the juncture between the said wall and said circular member for material flow from said melting chamber into said drawing chamber over said edge of said member, said edge of said member being positioned at a level above said passage means to provide a pool of molten material between said edge and said inner wall to form a fluid seal between said drawing chamber and said melting chamber, and a high frequency induction coil encircling said outer wall substantially opposite said edge of said member.

6. A melting and drawing crucible comprising, inner and outer annular walls connected by transverse walls extending therebetween to thereby form a chamber closed at the top and bottom thereof, the lower one of said transverse walls having a plurality of orifices therein through which molten material may be exuded, a circular wall member extending transversely of said inner wall intermediate of said transverse walls and having a peripheral edge thereof positioned within the space between said inner and outer walls, said inner wall and said member forming a chamber to receive materials to be melted therein, passage means through said inner wall at the juncture between the said wall and said circular member for material flow from said melting chamber into said drawing chamber over said edge of said member, said edge of said member being positioned at a level above said passage means to provide a pool of molten material between said edge and said inner wall to form a fluid seal between said drawing chamber and said melting chamber, and a high frequency coil encircling said outer wall substantially opposite said edge of said member comprising a plurality of parallel annular rings in spaced relationship and interconnected electrically in series.

7. A melting and drawing crucible comprising, an annular outer drawing chamber, an inner circular melting chamber, passage means between said chambers for conducting material melted in said melting chamber into said drawing chamber, a fining edge adjacent said passage and within said outer chamber over which the melted material flows, and a high frequency induction coil encircling said drawing chamber substantially at the level of said fining edge for inductively heating the crucible.

8. A melting and drawing crucible comprising, an annular outer drawing chamber, an inner circular melting chamber, passage means between said chambers for conducting material melted in said melting chamber into said drawing chamber, a fining edge adjacent said passage and within said outer chamber over which the melted material flows, and a plurality of split substantially annular rings positioned in parallel relationship disposed substantially at the level of said fining edge and connected electrically in series to form a high frequency induction coil.

9. A melting and drawing crucible comprising, a melting chamber open to atmospheric pressure, a drawing chamber positioned around said melting chamber, means forming a passage extending between said melting chamber and said drawing chamber for flow of molten material from the melting chamber into the drawing chamber and in which molten material is present to form with a fining edge adjacent said passage forming means a liquid seal between the drawing chamber and the melting chamber when filled with molten material whereby to close said drawing chamber against atmospheric pressure in said melting chamber, and an inductive heating coil encircling said drawing chamber substantially opposite said passage means.

10. A melting and drawing crucible comprising, a melting chamber open to atmospheric pressure, a drawing chamber positioned around said melting chamber, means forming a passage extending between said melting chamber and said drawing chamber for flow of molten material from the melting chamber into the drawing chamber and in which molten material is present to form with a fining edge adjacent the said passage forming means a liquid seal between the drawing chamber and the melting chamber when filled with molten material whereby to close said drawing chamber against atmospheric pressure, and an inductive heating coil encircling said drawing chamber substantially opposite said passage forming means comprising a plurality of split annular rings disposed one above the other in parallel and concentric relationship and having bar means extending between said rings for connecting them electrically in series.

11. A melting and drawing crucible comprising, a melting chamber open to the atmosphere and having a lower wall member provided with an annular edge surface over which material melted in said chamber flows, a drawing chamber disposed around said melting chamber and having said edge disposed therein whereby molten material is received within the drawing chamber from the melting chamber, passage means between a wall of said drawing chamber and said edge of said member through which molten material flows from the melting chamber into the drawing chamber and forming a liquid seal between the melting chamber and the drawing chamber when filled with molten material to close said drawing chamber against the atmosphere, means for introducing a gaseous pressure into said drawing chamber, and an induction heating coil encircling said drawing chamber substantially at the level of said edge of said member.

12. A melting and drawing crucible comprising, an annular outer drawing chamber, an inner circular melting chamber, passage means between said chambers for conducting material melted in said melting chamber into said drawing chamber, and a plurality of split substantially annular rings positioned in parallel relationship disposed substantially at the level of said passage means, connected electrically in series to form a high frequency induction coil, an induction ring positioned beneath said melting chamber, and support means passing through said melting chamber upon which said second ring is secured, said support means including means securing the same to said first mentioned annular rings to support said second ring therefrom.

13. A melting and drawing crucible comprising an annular outer drawing chamber having a lower wall provided with a plurality of orifices through which molten material may be exuded and an upper wall forming a ledge, an inner melting chamber, a planing plate between said melting chamber and said drawing chamber forming a surface over which molten material flows from the melting chamber into said drawing chamber, said planing plate having a planing edge positioned closely adjacent said ledge wall of said drawing chamber, and a high frequency induction coil encircling said drawing chamber substantially at the level of said planing edge and having an angular surface positioned closely adjacent the outer wall of said drawing chamber and said ledge wall for inductively heating the crucible with energy concentration in the area of the planing edge to maintain the same at the highest possible temperature.

CHARLES R. STEVENS.

REFERENCES CITED

The following references are of record in the file of this patent:

UNITED STATES PATENTS

| Number | Name | Date |
| --- | --- | --- |
| 2,159,361 | Atkinson et al. | May 23, 1939 |
| 2,181,030 | Thomas | Nov. 21, 1939 |
| 2,229,489 | Barnard | Jan. 21, 1941 |
| 2,331,946 | Von Pazsiczky et al. | Oct. 19, 1943 |
| 2,398,952 | Nachod | Apr. 23, 1946 |
| 2,408,229 | Roberds | Sept. 24, 1946 |